(12) United States Patent
Gray (10) Patent No.: US 6,789,849 B2
(45) Date of Patent: Sep. 14, 2004

(54) FOLD-FLAT SEAT RECLINING AND LOCKING MECHANISM

(75) Inventor: Larry Gray, Westfield, IN (US)

(73) Assignee: Porter Engineered Systems, Inc., Westfield, IN (US)

(*) Notice: Subject to any disclaimer, the term of this patent is extended or adjusted under 35 U.S.C. 154(b) by 51 days.

(21) Appl. No.: 09/863,915

(22) Filed: May 23, 2001

(65) Prior Publication Data
US 2003/0025375 A1 Feb. 6, 2003

(51) Int. Cl.⁷ .................................................. B60N 2/02
(52) U.S. Cl. ................................ 297/378.12; 297/367
(58) Field of Search ............................. 297/367, 378.12

(56) References Cited

U.S. PATENT DOCUMENTS

| | | | |
|---|---|---|---|
| 3,580,635 A | | 5/1971 | Posh et al. |
| 3,887,232 A | | 6/1975 | Dinkel |
| 4,103,964 A | | 8/1978 | Klingelhofer et al. |
| 4,634,182 A | | 1/1987 | Tanaka |
| 4,653,807 A | * | 3/1987 | Hirose |
| 4,685,736 A | | 8/1987 | Tanaka et al. |
| 4,765,681 A | * | 8/1988 | Houghtaling et al. |
| 4,875,735 A | * | 10/1989 | Moyer |
| 5,154,476 A | * | 10/1992 | Haider |
| 5,482,349 A | | 1/1996 | Richter et al. |
| 5,547,254 A | | 8/1996 | Hoshihara |
| 5,588,705 A | | 12/1996 | Chang |
| 5,690,386 A | * | 11/1997 | Chabanne |
| 5,733,007 A | * | 3/1998 | Williams |
| 6,113,190 A | | 9/2000 | Negi et al. |
| 6,199,953 B1 | | 3/2001 | Chen |

FOREIGN PATENT DOCUMENTS

| | | | |
|---|---|---|---|
| DE | 19633782 C1 | | 3/1998 |
| EP | 839686 A2 | | 5/1998 |
| GB | 2085959 | * | 5/1982 |
| JP | 6-217837 | * | 8/1994 |

OTHER PUBLICATIONS

Copy of International Search Report completed on Sep. 25, 2002.

* cited by examiner

Primary Examiner—Laurie K. Cranmer
(74) Attorney, Agent, or Firm—Baker & Daniels (57) ABSTRACT

A seat reclining and fold-flat mechanism for reclining the seat-back, folding the seat-back flat and locking the seat in an upright or reclined position. The mechanism includes an arm, a pawl and a locking member. The arm is pivoted to the frame at one end and attached to the seat-back at a second opposite end to pivot the seat-back relative to the frame. The pawl is pivoted to the frame and pivots between a locked position, in which the pawl engages the arm to prevent arm from pivoting, and a released position, in which the pawl releases arm allowing arm to pivot. The locking member secures the pawl in the locked position, thereby securing seat-back in an upright or reclined position even when substantial force is executed on the seat-back.

26 Claims, 5 Drawing Sheets

FOLD-FLAT SEAT RECLINING AND LOCKING MECHANISM

FIELD OF THE INVENTION

The present invention relates to reclining and fold-flat mechanisms for the passenger seats in a vehicle. More specifically, the invention relates to a mechanism that allows a seat to be reclined or folded flat, and also, serves to lock the seat in its reclined or upright position.

BACKGROUND OF THE INVENTION

Many seat reclining mechanisms are known and used in the automotive industry. In some applications a fold-flat feature is provided that allows the seat back to be folded forward to a flat position substantially parallel to the seat bottom. Such an arrangement enhances cargo space and is commonly found in vans and sport utility vehicles. Some amount of fold over is also required in two door vehicles to allow access to the rear seats or rear compartment area. In addition it is often desirable to provide some degree of recline adjustment. In some applications, the second row seating is divided in a 60/40 split arrangement in which 60% of the second row seating folds and reclines independent of the remaining 40%. This design provides additional flexibility and individuality in the adjustment the passengers' seating, thus providing a more comfortable seating position.

The federal government has imposed standards for seats having a reclining and fold-flat feature. These standards include requiring that the seat back not be pivotable relative to the seat except during actuation of a release mechanism. The federal regulations further require that the mechanism for locking the seat-back in a stationary position be capable of withstanding the load exerted on the seat-back when the passenger is thrusted forward during sudden braking or in a collision. These standards are particularly important in the case where the safety belt is secured to the seat-back thereby casting a significant load on the back of the seat during rapid deceleration.

The currently available seat reclining and folding mechanisms present several disadvantages. First, the hardware is typically complex and consists of many close fitting interacting parts. This complexity contributes to the difficulty in production, assembly and maintenance of the mechanisms; ultimately increasing production costs, as well as, maintenance and repair costs.

For instance, many reclining assemblies, such as the system described in U.S. Pat. No. 4,634,182 to Tanaka, employ two separate mechanisms: (1) a hinge mechanism for reclining the seat-back backwards, and (2) a separate inertia operated lock system for permitting the seat to fold forward and to lock the seat back in the upright position. The existing inertia operated lock systems, such as that employed in Tanaka, are often based on a pendulum system that locks the seat in its upright position upon a sudden forward tilting motion of the seat. In these assemblies the hinge mechanism remains unlocked even when the seat is occupied and while the vehicle is in operation. Only when the pendulum swings forward due to deceleration does the inertia operated lock operate to lock the seat-back in the upright position.

These arrangements pose many disadvantages. First, these assemblies comprise two separate mechanisms; a hinge mechanism and an inertia operated lock mechanism, each having complex multiple parts. This ultimately results in an increase in the cost of production. Moreover, the use of multiple components increases the chance of malfunction and increases the cost of maintenance and repair.

Other seat recliner mechanisms employ complex parts such as multiple gears or multiple hinges. These multiple parts create a complex mechanism that is difficult to produce and difficult to repair. Furthermore, the multiple gear systems have a greater chance of getting gummed up, thus decreasing their effectiveness.

In light of the disadvantages existing in the current seat reclining mechanisms a need remains for a seat reclining and fold-flat mechanism that employs one mechanism to recline the seat-back, fold the seat-back flat, and lock the seat-back in an upright position. In addition there is a need for such a system that is easy to operate, light weight, compact and that can be manufactured at a reasonable cost. Furthermore, such a system must be capable of maintaining the seat-back in the locked position when the seat-back is subjected to the force of a passenger being thrust forward during sudden deceleration or collision.

SUMMARY OF THE INVENTION

In order to address the needs unfulfilled by prior devices, the present invention contemplates a mechanism for use in a vehicle seat that permits reclining the seat-back, allows folding the seat-back flat, and securely locks the seat in an upright or reclined position.

In one embodiment, the mechanism includes an arm attachable at one end to the seat-back, and pivotably attachable at an opposite second end to the frame. The arm, and thereby the seat-back, is pivotable relative to the frame. A pawl is provided having a pivot end pivotably attachable to the frame and a gripping end. The pawl is movable between a locked position, in which the gripping end engages the arm to prevent the arm from pivoting, and a released position, in which the gripping end is free from the arm, thereby permitting the arm to pivot. The mechanism also includes a means for releasably securing the pawl in its locked position.

In one feature of the invention, the means for releasably securing the pawl in its locked position includes a locking member. The locking member has a pivot end that is pivotably attachable to the frame and a bearing end. The locking member pivots between a supporting position and a freeing position. In the supporting position, the bearing end applies a force to the pawl to urge the pawl into its locked position. In the freeing position, the bearing end is free from the pawl allowing the pawl to pivot to its released position.

In another aspect of the invention, when the pawl is in its locked position, the gripping end of the pawl and the second end of the arm are locked in an interdigitated engagement. The interdigitated engagement can include a number of teeth and notches defined on both the gripping end of arm and the second end of the arm. To provide adjustability in the recline angle, the number of teeth and notches defined on the arm can be greater than the number of teeth and notches defined on the gripping end of the pawl.

A further aspect of the invention includes a means for pivoting the locking member between its supporting position and its freeing position. The means for pivoting the locking member can include a torsion bar assembly. The torsion bar assembly includes a torsion bar having a working end connected to the locking member of a mechanism attached to one side of the seat, and a slave end connected to the locking member of a mechanism attached to the other side of the seat. A cable control arm is attached to the torsion bar adjacent the working end. A cable is provided that connects at one end to a lever and at the other end to the frame. The cable has a first slack condition and a second taut condition. When the lever is engaged, the cable changes from its slack condition to its taut condition. A cable conduit is attached to the cable and operates to pivot the control arm when the cable is in its taut condition, thereby turning the torsion bar and pivoting the locking member.

It is an object of the invention to provide a mechanism that reclines the seat-back, folds the seat-back flat, and locks the seat-back in an upright or reclined position.

It is a further object of the invention to provide a fold-flat seat reclining mechanism that is capable of maintaining the seat-back in the locked position when the seat-back is subject to the force of a passenger being thrust forward during sudden deceleration or collision.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 1:
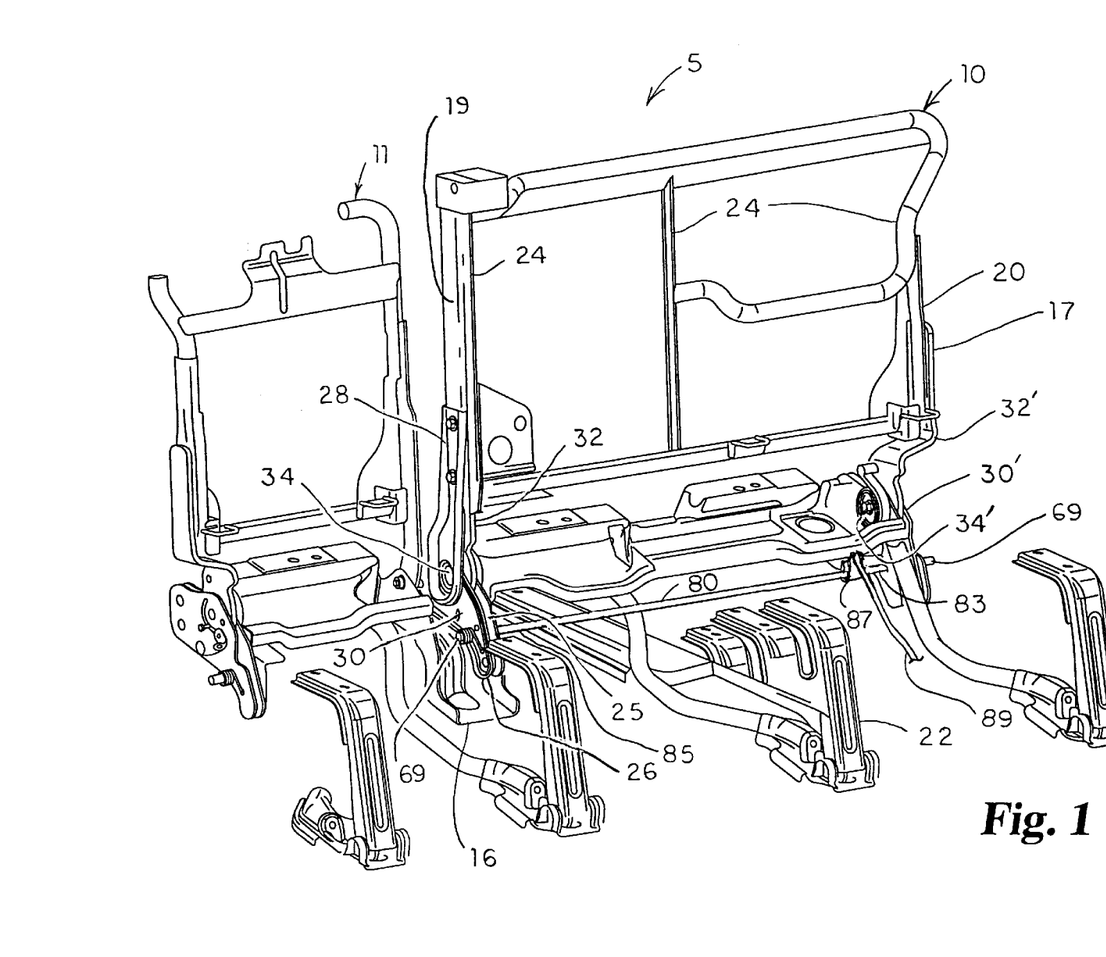
FIG. 1 is a front perspective view of a seat frame assembly having a fold-flat reclining mechanism according to one embodiment of the present invention.

One type of 60/40 split-type vehicle seat assembly 5 is depicted in FIG. 1. This seat assembly 5 is divided into two independently operating seat portions 10 and 11. Seat portion 10 comprises 60% of the seat assembly 5, while seat portion 11 comprises the remaining 40% of seat assembly 5. Although the drawings illustrate, and the following discussion describes, the mechanism as used in a 60/40 spilt seat, the mechanism can also be used in other seat designs.

Seat portion 10 includes a bottom cushion and a cushioned seat-back (not shown) supported by a seat frame assembly 20, which includes a bottom frame 22 and seat-back frame 24. The bottom frame 22 is fastened to a brace 16, which is attached to the vehicle floor, to secure seat portion 10 to the vehicle. In a preferred vehicle application, the seat portion incorporates a pair of fold-flat recliner mechanisms 30 and 30' according to the present invention, one mechanism for each side of seat portion 10. Mechanism 30' connects seat-back frame 24 to bottom frame 22 at the side of the seat 10 that is adjacent to the door of the car (the door side 17 of seat 10). Mechanism 30 connects seat-back frame 24 to bottom frame 22 at the side of seat 10 that is adjacent to seat 11 (the inner side 19 of seat 10).

One embodiment of the fold-flat recliner mechanism 30 of the present invention is shown in more detail in FIGS. 3–5(c). According to one preferred embodiment, mechanism 30 (30') includes an arm 32 (32') attached at a first end 33 to seat-back frame member 24. The attachment can be by appropriate fasteners, such as bolts or rivets. Arm 32 is pivotably mounted at an opposite second end 35 to bottom frame 22 to permit pivoting of arm 32, and thus, pivoting of seat-back frame 24 relative to seat bottom frame 22. Specifically, the arm 32 is mounted by a pivot pin 34, pivot bolt or the like as is known in the art.

Figure 2:
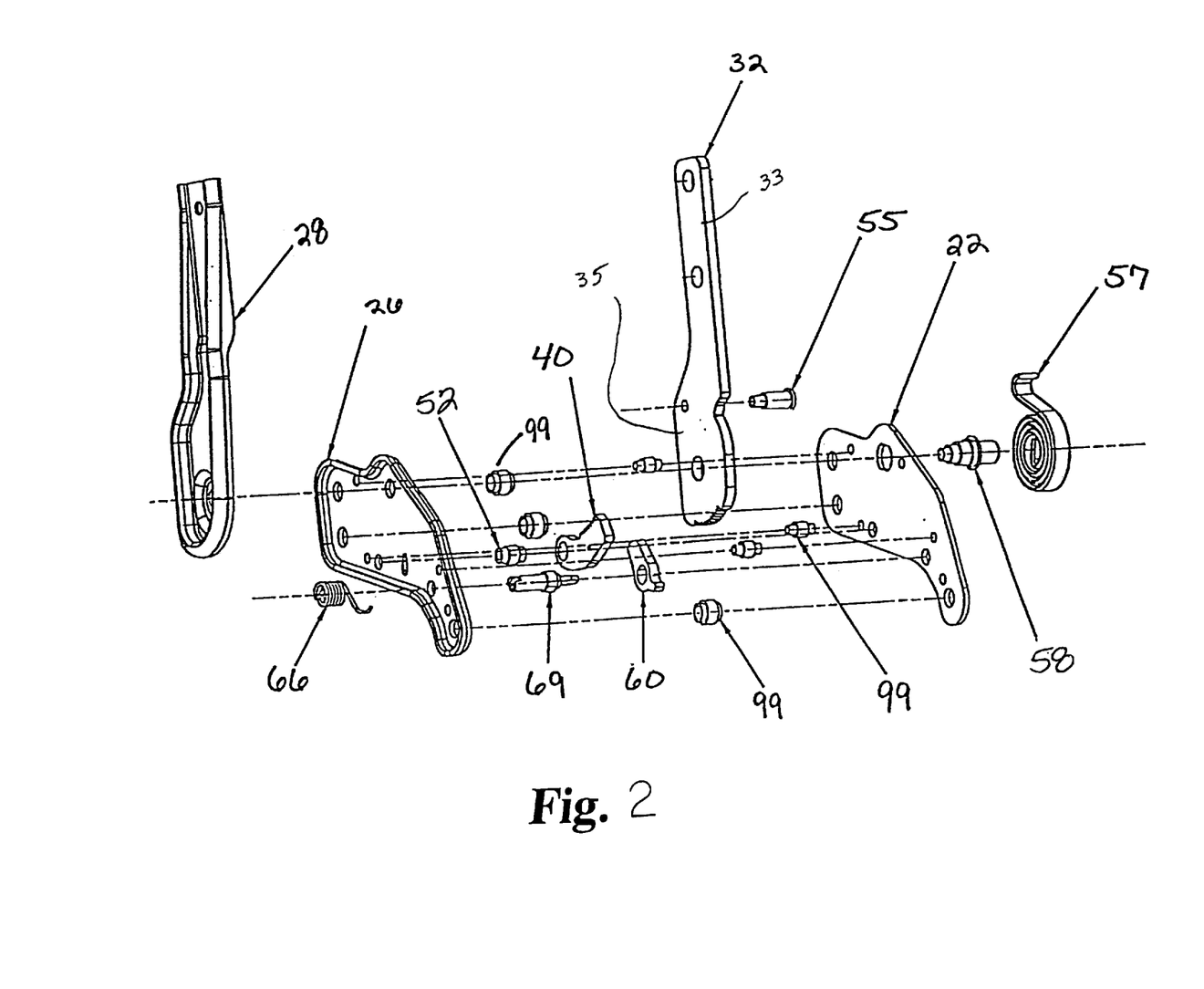
FIG. 2 is an exploded view of the fold-flat reclining mechanism of FIG. 1.
Figures 5A, 5B:
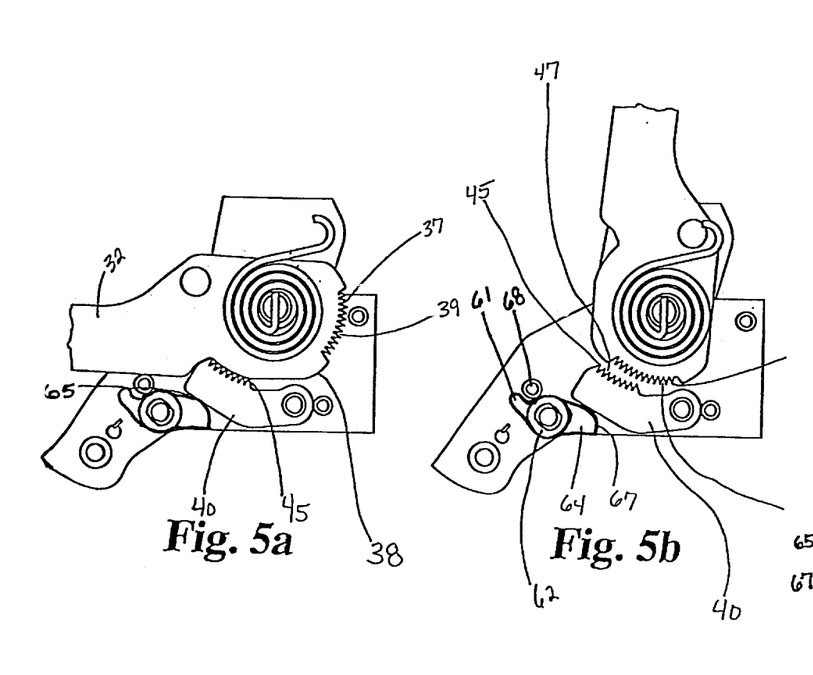
FIG. 5a is a side elevational view of the fold-flat mechanism shown in FIG. 3 depicting an arm of the mechanism in a fold-flat position.
FIG. 5b is a side elevational view of the fold-flat mechanism of FIG. 5a showing the arm in an unlocked position.
Figure 5C:
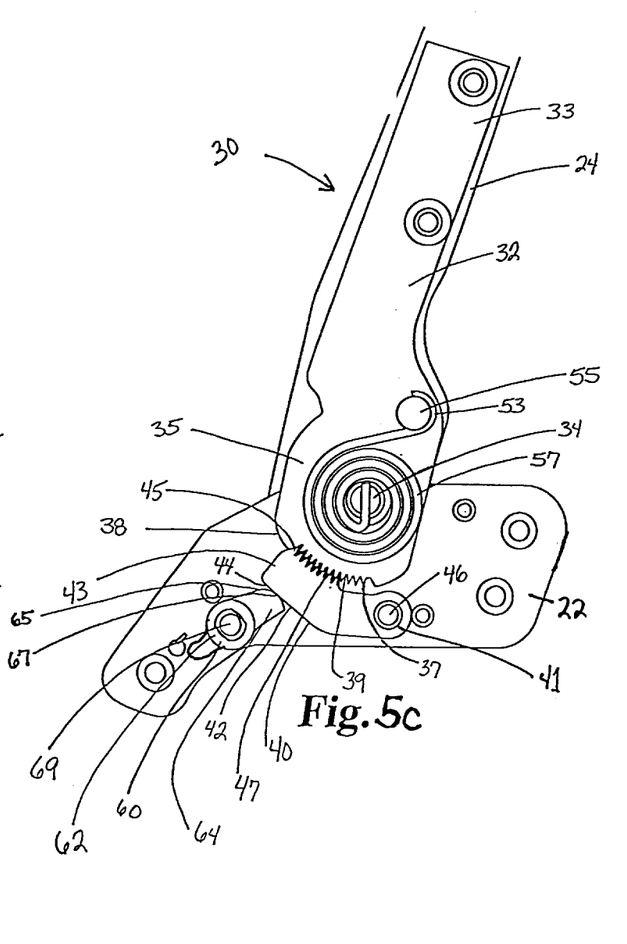
FIG. 5c is an enlarged side elevational view of the fold-flat mechanism of FIG. 5a showing the arm in an upright and locked position.

Mechanism 30 also includes a pawl 40. Pawl 40 has a pivot end 41, which is pivotably attached to bottom frame 22, and an opposite gripping end 43. The pawl 40 is pivotable about pivot point 46, which may include a bolt, pin 52 or rivet as shown in FIG. 2. The pawl can pivot between a released position as shown in FIGS. 5a and 5b and a locked position as depicted in FIG. 5C. As illustrated in FIG. 5c, when pawl 40 is in the locked position the gripping end 43 of pawl 40 engages the second end 35 of arm 32 to prevent arm 32, and thereby, seat-back portion 14, from pivoting.

Figure 3:
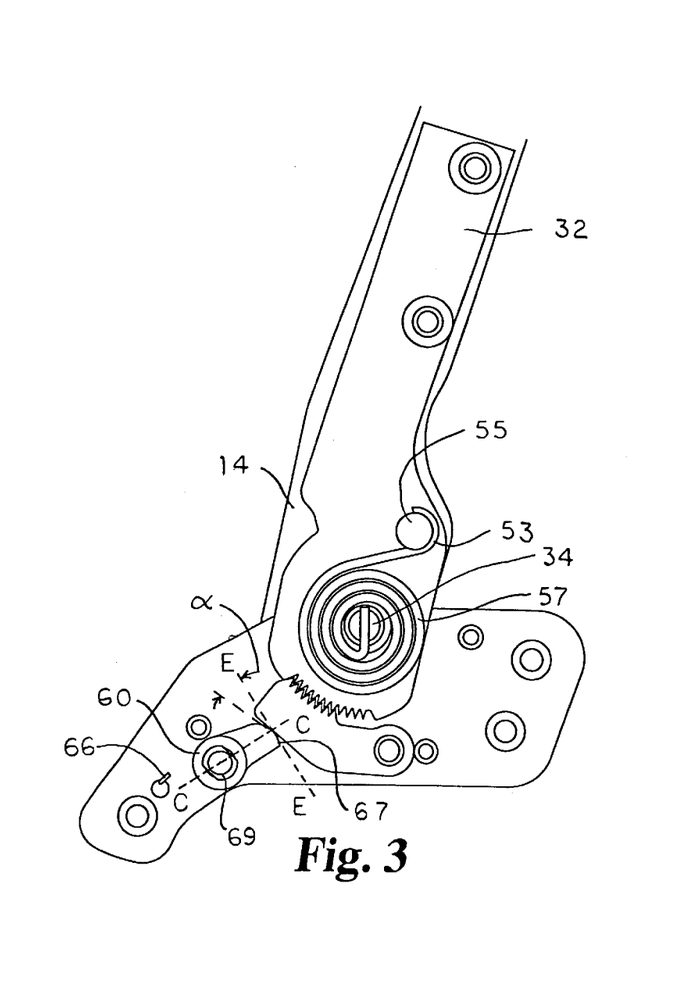
FIG. 3 is an enlarged side elevational view of the fold-flat reclining mechanism depicted in FIG. 1.

In a preferred embodiment of the invention, the gripping end 43 of pawl 40 engages the second end 35 of arm 32 in an interdigitated engagement 50 comprising 8 engaged teeth as shown in FIGS. 3 and 5c. The interdigitated engagement 50 includes a first series of teeth 37 and of notches 39 defined in the second end 35 of arm 32. This engagement 50 can also include a second series of teeth 45 and notches 47 defined in the gripping end 43 of pawl 40. Teeth 45 and notches 47 of pawl 40 interlock with teeth 37 and notches 39 of arm 32 to prevent arm 32 from pivoting. In addition, the second end 35 of arm 32 is arcuate having a pitch radius of between 1.711 and 1.847 inches relative to pivot point 34. The gripping end 43 of pawl 43 has a complimentary arcuate surface for firmly engaging the arcuate second end 35 of arm 32.

It is often useful to provide multiple reclining positions of seat-back 14 when seat-back 14 is in its locked position. To provide this adjustability the second end 35 of arm 32 can define a greater number of teeth 37 and notches 39 than the number of the teeth 45 and notches 47 defined in the gripping end 43 of pawl 40. In this arrangement the gripping end 43 of pawl 40 can be adjusted to engage different sets of teeth 37 and notches 39 of arm 32 resulting in as many possible reclining positions.

Figure 4:
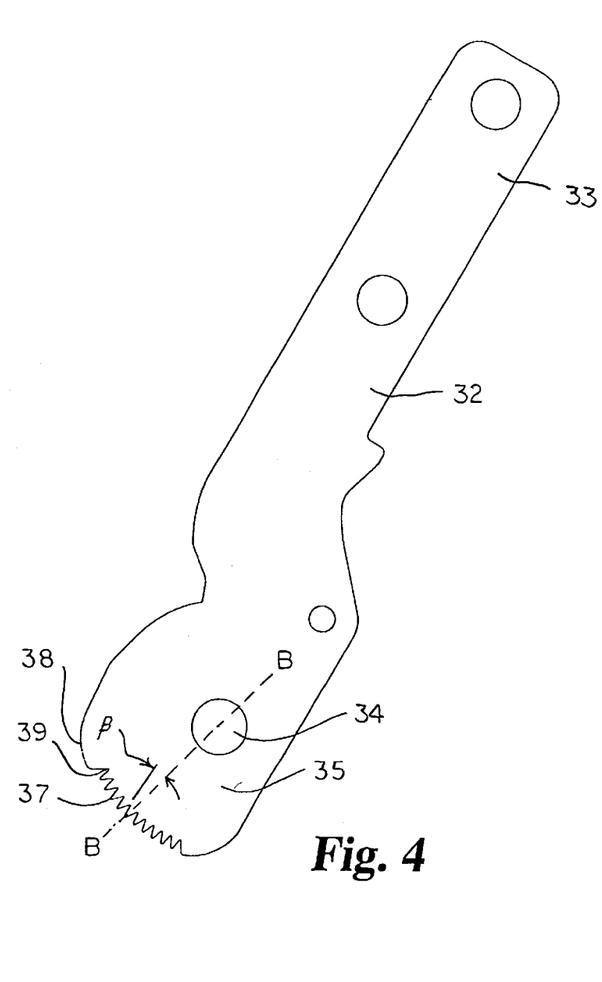
FIG. 4 is an enlarged side elevational view of the arm of the fold-flat mechanism according to a preferred embodiment of the invention.

In one aspect of the invention, teeth 37 and teeth 45 are angled to provide a more secure engagement and a greater resistance to the forward force applied to the seat-back, such as might arise during a collision. A line of force exists between the pivot point 34 of arm 32 and the center of each of teeth 37 and 45. An example of this line of force is shown in FIG. 4 by line B—B. The surface of teeth 37 and 45 and their corresponding notches 47 and 39 can be angled away from the line of force B—B, preferably at an angle (β) of about 40°. This design is intended to provide a stronger interface having less chance of breaking teeth when sudden force is applied to the seat-back. Ultimately, this means that the design aids in maintaining the seat in a locked, upright position preventing the seat back from pivoting forward. In addition, teeth 37 are recessed in arm 32 and have a width of 0.095 to 0.1001 inches and a height of about 0.15 inches. This configuration helps to prevent slippage and misalignment.

Referring now to FIG. 5a, the second end of arm 32 also defines a smooth cam edge 38 adjacent recessed teeth 37. When the operator desires to fold the seat flat, the pawl 40 is pivoted to the released position, releasing recessed teeth 37. Arm 32 is tilted forward to allow teeth 45 of pawl 40 to contact cam edge 38 and slide along smooth cam edge 38 until arm 32 and seat-back 14 are in the fold-flat position.

As illustrated in FIG. 3, the preferred embodiment can include a locking member 60 for releasably securing pawl 40 in the locked position. Locking member 60 is pivotably attached at a pivot end 62 to bottom frame 22. Locking member 60 further includes a bearing end 64, which defines a curved cam surface 65 leading to an engaging surface 67. As shown in FIGS. 5a–5c locking member 60 is pivotable between a releasing position (FIGS. 5a and 5b) and a locking position (FIG. 5c). In the releasing position, the engaging surface 67 does not apply the force to pawl 40 thereby allowing the pawl 40 to be released from the locked position. In the locking position (FIG. 5c), the engaging surface 67 applies a force to pawl 40 to urge pawl 40 into the locked position.

In one embodiment, the locking member 60 includes a flange 61 protruding from the pivot end 62 (FIGS. 5a–c). Flange 61 engages a stop pin 68 attached to bottom frame 22 to limit the pivotal movement of locking member 60 as it is pivoted to the release position. The flange 61 prevents rotating the locking member 60 past the point at which the pawl 40 will fall beyond the reach of the locking member.

In particular, the gripping end 43 of pawl 40 defines a lower edge 42 opposite teeth 45. Lower edge 42 includes a supporting surface 44 which reacts with the force applied by engaging surface 67 of locking member 60 when the member is in the locking position shown in FIG. 5c. In the locking position, the locking member 60 holds pawl 40 in tight interdigitated engagement with arm 32. It is this engagement that prevents the seat-back 14 from pivoting.

Referring now to FIG. 3, a line of force C—C extends between pivot point 69 of locking member 60 and engaging surface 67. Line of force C—C is offset from a line which extend between pivot point 34 of arm 32 and equals about 3.65 inches. This offset facilitates the release of the locking member when pivoted. A line of action E—E is also shown, which is a line perpendicular to the line of force C—C. It has been demonstrated that when the angle of an engagement of two surfaces is at a Morse angle (typically between 5° and 8° relative to the line of action) considerable frictional resistance to dislodgment is provided. Consequently, to provide an even more secure engagement between engaging surface 67 and support surface 44 the angle (α) of the cam surface 65 leading to the engaging surface 67 can be a Morse angle having an angle of 5°–8° relative to the line of action E—E (stated in another way, 82°–85° relative to line of force C—C).

Figure 6A:
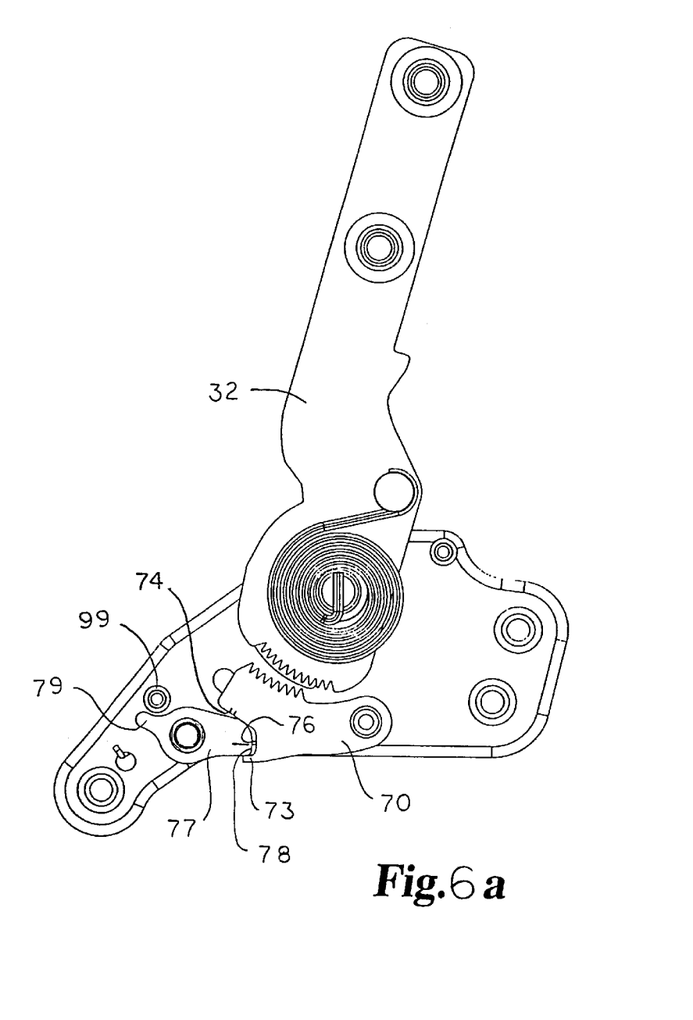
FIG. 6a is a side elevational view of a fold-flat mechanism according to another embodiment of the present invention.
Figure 6B:
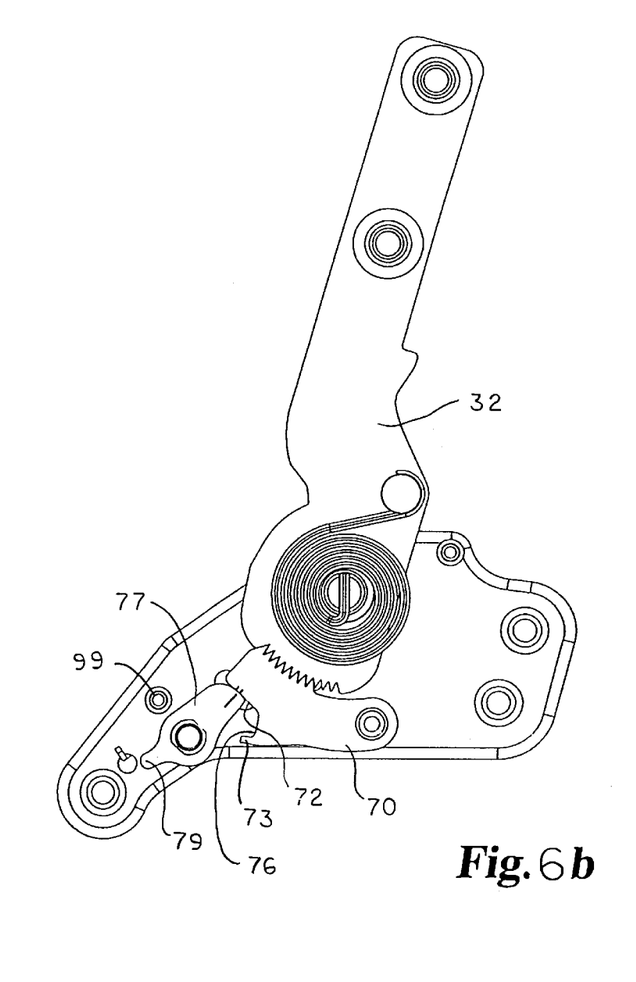
FIG. 6b is a side elevational view of the fold-flat mechanism of FIG. 6a showing the arm in a locked position.

Mechanism 30 can also includes means for pivoting the pawl between the locked position and the released position. The embodiment in FIGS. 6a–6b shows one possible means for pivoting a pawl 70. In this embodiment the lower edge 72 of pawl 70 defines a projecting lip 73 adjacent to support surface 74. When a locking member 77 pivots from the locking position, shown in FIG. 6b, to the releasing position, shown in FIG. 6a, the locking tip 78 of member 77 engages lip 73 causing pawl 70 to pivot from the locked position to the released position. The lip 73 can be curved so that the tip 78 of the member can pivot smoothly. Preferably, lip 73 is configured to "capture" locking member 77 in a gap 76 between lip 73 and support surface 74.

Alternatively, the force of gravity can serve as the means for pivoting pawl 40 from the locked position to the released position. In this arrangement pawl 40 is pivoted to the locked position when locking member 60 is pivoted to the locking position. When the locking member 60 pivots to the releasing position, pawl 40 falls to its released position due to the force of gravity.

In a further feature, the locking member 77 can include a finger 79 projecting from the end of the member opposite the locking tip 78. As depicted best in FIG. 6a, the finger 79 contacts one of the spacers 99 situated between the components of the mechanism 30. This finger serves to limit the movement of the locking member 77 in its released position, and holds the locking tip 78 within the gap 76 to support the pawl 70.

In reclining seats, it is also useful to provide a means for restoring the seat-back 14 from a reclined position to the upright position. A pivot spring 57 can be employed for this purpose. As shown in FIGS. 2 and 5c pivot spring 57 is attached to pivot point 34 of arm 32 by a bolt 58, pin or rivet. Pivot spring 57 ends in a hook 53 which engages stop pin 55. When arm 32 is forced to a reclined position, stop pin 55 engages hook 53 to pull pivot spring 57 to an extended state. When arm 32 is released from the reclined position, pivot spring 57 returns to its natural, relaxed state and hook 53 pulls arm 32 and thereby seat-back 14, by stop pin 55, to the upright position. This pivot spring can be of known configuration.

The invention further contemplates a means for pivoting the locking member 60 from the locking position to the releasing position. In the preferred embodiment the means for pivoting locking member 60 can be a torsion bar assembly, which can be seen in FIG. 1. This assembly includes a torsion bar 80, which has a master end 83 and a slave end 85. The master end 83 is attached to the pivot pin 69 of locking member 60 of mechanism 30. The opposite slave end 85 of torsion bar 80 is attached to the pivot pin of a locking member of the mechanism 30' on the opposite side of the seat.

A cable control arm 87 extends perpendicularly from torsion bar 80 adjacent master end 83. In one embodiment, a cable 89 is attached at one end to an actuator (not shown), which can be of a conventional form, such as a lever or a release button. Pulling the cable causes the torsion bar to rotate, thereby rotating the locking members to their releasing position.

In some vehicles, the seat bottom must be displaced to allow the seat-back to move to its fold-flat position. Thus, in an alternative embodiment, the actuation end of cable 89 can be attached to the seat bottom 12 of the seat. The cable has a natural slack condition when seat bottom 12 rests on bottom frame 22. When bottom cushion 12 is lifted away from bottom frame 22 the cable 89 is pulled to a taut condition, thereby causing the control arm 87 to pivot. The pivoting of control arm 87 rotates torsion bar 80, which in turn pivots the attached locking member 60 to the releasing position.

In another embodiment, a torsion spring 66 is mountable on either side of plate 22 and is affixed to the locking member 60 at pivot pin 69 as shown in FIG. 2. Torsion spring 66 biases locking member to the locking position. In this configuration, locking member 60 has its natural state in the locking position, thereby automatically locking the seat when the means for pivoting the locking member is not actuated.

To maintain the effectiveness of the mechanism 30, it is helpful to provide a means for covering and protecting the working parts of the mechanism. Referring back to FIGS. 1 and 2, a plate 26, preferably about 4 mm thick, is affixed to bottom frame 22 in such a way to create an inner space 25 between plate 26 and bottom frame 22. Spacers 99 can be used to secure the inner space 22 between plate 26 and bottom frame 22. The pawl 40, arm 32, and locking member 60 are contained within inner space 25. Bracket 28 attaches at one end to both arm 32 and seat-back frame 24. The opposite second end of bracket 28 is pivotally attached to plate 26. Plate 26 covers and protects mechanism 30 from debris and dirt that can cause the working parts to become gummed up and affect their performance. Bracket 28 stabilizes both arm 32 and plate 26. Together, plate 26 and bracket 28 add strength to the mechanism and help to secure the working parts in place. This reinforcing arrangement also allows the use of thinner metal. For instance, locking member 60, pawl 40 and arm 32 can be made of metal only 8 mm thick and can be enveloped in an inner space 25 slightly wider than 8 mm.

In another embodiment, the bottom cushion 12 slides on a rail. In this arrangement, the seat cushion 12 slides forward when seat-back 14 is folded forward. This feature aids in allowing the seat-back 14 to fold completely flat, parallel to bottom cushion 12.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A fold-flat seat recliner mechanism for a seat having a seat, a seat-back and a frame, comprising:
    an arm attachable at one end to the seat-back, and pivotably attachable at an opposite second end to the frame to permit pivoting of the seat-back relative to the frame;
    a stop pin mountable on the frame;
    a pawl having a pivot end pivotably attachable to the frame and a gripping end, said pawl movable between a locked position in which said gripping end engages said second end of said arm to prevent said arm from pivoting, and a released position in which said gripping end is free from said second end of said arm, thereby permitting said arm to pivot; and
    a locking member having a pivot end pivotably attachable to the frame, said locking member pivotable between a rotated position and a relaxed position, and associated with said pawl such that said pawl is in said locked position when said locking member is in said rotated position and said pawl is in said released position when said locking member is in said relaxed position, said locking member including a flange projecting from said pivot end and wherein said flange engages said stop pin mountable on the frame to limit the pivoting of said locking member, wherein said locking member includes a bearing end, and said gripping end of said pawl defines a lower edge having a support surface, said bearing end engaging said support surface when said locking member pivots to said rotated position to position said pawl in said locked position, wherein said locking member is pivotable away from said pawl to permit said pawl to pivot to said released position by force of gravity.

2. The fold-flat seat recliner mechanism of claim 1 further comprising an interdigitated engagement between said gripping end of said pawl and said second end of said arm.

3. The fold-flat seat recliner mechanism of claim 1 further comprising a means for sliding the seat away from the seat back to allow the seat back to fold flat on top of the seat.

4. The fold-flat seat recliner mechanism of claim 1 further comprising means for pivoting said locking member away from said pawl to permit said pawl to pivot to said released position and thereby allow the seat back to recline or fold flat.

5. The fold-flat seat recliner mechanism of claim 4, wherein said means for pivoting said locking member away from said pawl includes:
    a torsion bar having a working end connected to said pivot end of said locking member,
    and a means for turning said torsion bar, thereby pivoting said locking member.

6. The fold-flat seat recliner mechanism of claim 5, wherein said means for turning said torsion bar includes
    a cable control arm attached to said torsion bar adjacent said working end,
    a lever connected to said cable control arm, said lever pivoting said cable control arm to turn said torsion bar, said working end operating to pivot said locking member.

7. The fold-flat seat recliner mechanism of claim 5 the seat having a first end and a second end and a mechanism at each of the first and second ends of the seat wherein:
    said torsion bar defines a slave end opposite said working end, said slave end connected to the mechanism at the second side of the seat said means for turning said torsion bar thereby pivoting said locking member of both mechanisms.

8. The fold-flat seat recliner mechanism of claim 5, wherein said means for turning said torsion bar includes
    a cable control arm attached to said torsion bar adjacent said working end;
    a lever;
    a cable connectable to the frame at a first end and connected to said lever at an opposite second end, said cable having a first slack condition and a second taut condition; said lever engaging said cable to change said cable from said slack condition to said taut condition; and
    a cable conduit attached to said cable at a position between said first end of said cable and said second end of cable, said cable conduit engaging said control arm and operating to pivot said control arm when said cable is in said taut condition thereby turning said torsion bar.

9. The fold-flat seat recliner mechanism of claim 5 wherein said means for turning said torsion bar includes:
    a cable control arm attached to said torsion bar adjacent said working end;
    a cable connectable to the seat at a first end, and connectable to the frame at a second opposite end, said cable having a first slack condition and a second taut condition, said cable changing from said slack condition to said taut condition when the seat is lifted; and a cable conduit attached to said cable at a position between said first end of said cable and said second end of said cable, said cable conduit capable of engaging said control arm to pivot said control arm when said cable is in said taut condition thereby turning said torsion bar.

10. The fold-flat seat recliner mechanism of claim 1, wherein said bearing end of said locking member defines a curved cam surface and an adjacent engaging surface, said engaging surface applying said force to said support surface of said pawl.

11. The fold-flat seat recliner mechanism of claim 10, wherein said locking member defines a line of force between the pivot point of said locking member and said engaging surface, said engaging surface defining a non-perpendicular angle relative to said line of force.

12. The fold-flat seat mechanism of claim 11 wherein said angle is between 82° and 85° relative to said line of force.

13. A fold-flat seat recliner mechanism for a seat having a seat, a seat-back and a frame, comprising:
   an arm attachable at one end to the seat-back, and pivotably attachable at an opposite second end to the frame to permit pivoting of the seat-back relative to the frame;
   a stop pin mountable on the frame;
   a pawl having a pivot end pivotably attachable to the frame and a gripping end, said pawl movable between a locked position in which said gripping end engages said second end of said arm to prevent said arm from pivoting, and a released position in which said gripping end is free from said second end of said arm, thereby permitting said arm to pivot; and
   a locking member having a pivot end pivotably attachable to the frame, said locking member pivotable between a rotated position and a relaxed position, and associated with said pawl such that said pawl is in said locked position when said locking member is in said rotated position and said pawl is in said released position when said locking member is in said relaxed position, said locking member including a flange projecting from said pivot end and wherein said flange engages said stop pin mountable on the frame to limit the pivoting of said locking member, wherein said locking member includes a bearing end, and said gripping end of said pawl defines a lower edge having a support surface, said bearing end engaging said support surface when said locking member pivots to said rotated position to position said pawl in said locked position, further comprising a torsion spring mountable between said locking member and the frame to bias said locking member against said pawl to position said pawl in said locked position.

14. The fold-flat seat recliner mechanism of claim 13 further comprising an interdigitated engagement between said gripping end of said pawl and said second end of said arm.

15. The fold-flat seat recliner mechanism of claim 14 wherein said interdigitated engagement includes a number of teeth and a number of notches, said number of notches configured to receive said number of teeth when said gripping end of said pawl and said second end of said arm are in said interdigitated engagement.

16. The fold-flat seat recliner mechanism of claim 15 wherein said locking member defines a line of force between the pivot point of said locking member and said engagement surface, said a number of teeth angled relative to said line of force.

17. The fold-flat mechanism of claim 14 wherein said second end of said arm defines a first number of teeth and a first number of notches, said gripping end of said pawl defines a second number of teeth and a second number of notches; said first number of teeth engaging said second number of notches and said second number of teeth engaging said first number of notches to form said interdigitated engagement.

18. The fold-flat seat recliner mechanism of claim 17 wherein said arm defines a smooth cam edge adjacent said number of teeth, said pawl disengaging said interdigitated engagement when one of said second number of teeth contacts said smooth cam edge of said arm to permit the seat back to fold flat.

19. The fold-flat seat recliner mechanism of claim 17 wherein said first number of teeth is greater in number than said second number of teeth and said first number of notches is greater in number than said second number of notches to allow adjustment of said arm in said locked position, and thereby allow seat to lock in a reclined position.

20. The fold-flat seat recliner mechanism of claim 13 further comprising a means for sliding the seat away from the seat back to allow the seat back to fold flat on top of the seat.

21. The fold-flat seat recliner mechanism of claim 13 further comprising means for pivoting said locking member away from said pawl to permit said pawl to pivot to said released position and thereby allow the seat back to recline or fold flat.

22. The fold-flat seat recliner mechanism of claim 21, wherein said means for pivoting said locking member away from said pawl includes:
   a torsion bar having a working end connected to said pivot end of said locking member,
   and a means for turning said torsion bar, thereby pivoting said locking member.

23. The fold-flat seat recliner mechanism of claim 22, wherein said means for turning said torsion bar includes
   a cable control arm attached to said torsion bar adjacent said working end,
   a lever connected to said cable control arm, said lever pivoting said cable control arm to turn said torsion bar, said working end operating to pivot said locking member.

24. The fold-flat seat recliner mechanism of claim 22 the seat having a first end and a second end and a mechanism at each of the first and second ends of the seat wherein:
   said torsion bar defines a slave end opposite said working end, said slave end connected to the mechanism at the second side of the seat said means for turning said torsion bar thereby pivoting said locking member of both mechanisms.

25. The fold-flat seat recliner mechanism of claim 22, wherein said means for turning said torsion bar includes
   a cable control arm attached to said torsion bar adjacent said working end;
   a lever;
   a cable connectable to the frame at a first end and connected to said lever at an opposite second end, said cable having a first slack condition and a second taut condition; said lever engaging said cable to change said cable from said slack condition to said taut condition; and
   a cable conduit attached to said cable at a position between said first end of said cable and said second end of cable, said cable conduit engaging said control arm and operating to pivot said control arm when said cable is in said taut condition thereby turning said torsion bar.

26. The fold-flat seat recliner mechanism of claim 22 wherein said means for turning said torsion bar includes:

a cable control arm attached to said torsion bar adjacent said working end;

a cable connectable to the seat at a first end, and connectable to the frame at a second opposite end, said cable having a first slack condition and a second taut condition, said cable changing from said slack condition to said taut condition when the seat is lifted; and a cable conduit attached to said cable at a position between said first end of said cable and said second end of said cable, said cable conduit capable of engaging said control arm to pivot said control arm when said cable is in said taut condition thereby turning said torsion bar.

* * * * *